(12) United States Patent
Ohira

(10) Patent No.: US 11,165,074 B2
(45) Date of Patent: Nov. 2, 2021

(54) ION EXCHANGER

(71) Applicant: TOYOTA BOSHOKU KABUSHIKI KAISHA, Aichi (JP)

(72) Inventor: Junko Ohira, Kariya (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 264 days.

(21) Appl. No.: 16/393,485

(22) Filed: Apr. 24, 2019

(65) Prior Publication Data
US 2019/0348693 A1  Nov. 14, 2019

(30) Foreign Application Priority Data

May 9, 2018 (JP) .............................. JP2018-090540

(51) Int. Cl.
| | |
|---|---|
| *H01M 8/04044* | (2016.01) |
| *B01D 15/36* | (2006.01) |
| *B60L 58/33* | (2019.01) |
| *H01M 8/04029* | (2016.01) |

(52) U.S. Cl.
CPC ...... *H01M 8/04044* (2013.01); *B01D 15/362* (2013.01); *B01D 15/363* (2013.01); *B60L 58/33* (2019.02); *H01M 8/04029* (2013.01)

(58) Field of Classification Search
CPC ... B01J 20/26; B01J 39/05; B01J 41/05; B01J 41/07; B01J 43/00; H01M 8/04044; B01D 15/362; B01D 15/363; B01D 15/3847; B01D 15/366; B01D 15/361
See application file for complete search history.

(56) References Cited

U.S. PATENT DOCUMENTS 4,543,363 A * 9/1985 Yanagihara .......... B01D 15/361
    521/38
4,851,122 A * 7/1989 Stanley .................... B01J 39/04
    210/501

FOREIGN PATENT DOCUMENTS

| JP | H07-208166 | 8/1995 | |
|---|---|---|---|
| JP | 2005-011803 | 1/2005 | |
| WO | WO-2005065265 A2 * | 7/2005 | .............. B01J 49/08 |

OTHER PUBLICATIONS

IONAC ASB-2 (Product Information Sheet, SYBRON Chemicals, Inc., Accessed online at: https://watersoftener-parts.com/SERVICE-MANUALS/Clack/Ion-Exchange-Resin-Filter-Media/ionac_asb-2.pdf, Accessed on Mar. 29, 2021). (Year: NA).*
IONAC A-642 (MSDS, SYBRON Chemicals, Inc., Mar. 13, 1990, Accessed online at: https://hazard.com/msds/f2/bmf/bmfcn.html, Accessed on Mar. 29, 2021). (Year: 1990).*
IONAC C249 (Product Information Sheet, SYBRON Chemicals, Inc., Mar. 1999, Accessed online at: http://ep.yimg.com/ty/cdn/newater/SybronC249.pdf, Accessed on Mar. 29, 2021). (Year: 1999).*
Office Action issued in JP Patent Application No. 2018-090540, dated Jul. 20, 2021, English translation.

* cited by examiner

*Primary Examiner* — Ryan B Huang
(74) *Attorney, Agent, or Firm* — Greenblum & Bernstein, P.L.C.

(57) ABSTRACT

An ion exchanger includes a housing and an ion exchange resin filling the housing. The ion exchanger is configured to remove ions in a coolant through ion exchange when the coolant that has flowed into the housing passes through the ion exchange resin. The ion exchanger is also configured to discharge, from the housing, the coolant from which the ions have been removed. The ion exchange resin comprises a cation exchange resin, a strongly basic anion exchange resin, and a weakly basic anion exchange resin.

1 Claim, 3 Drawing Sheets

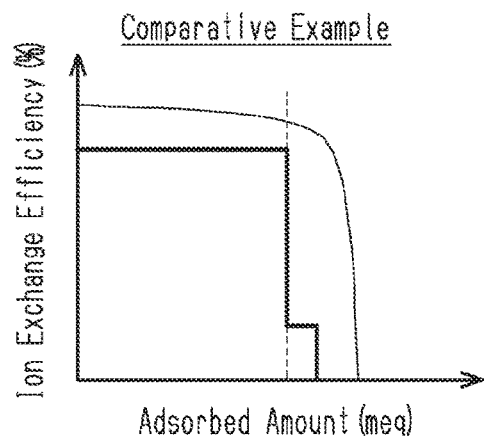
Fig.5A
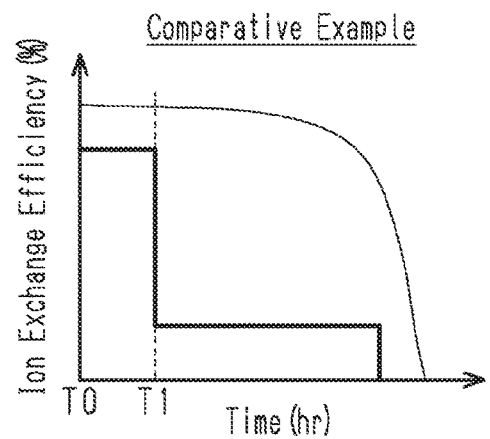
Fig.5B
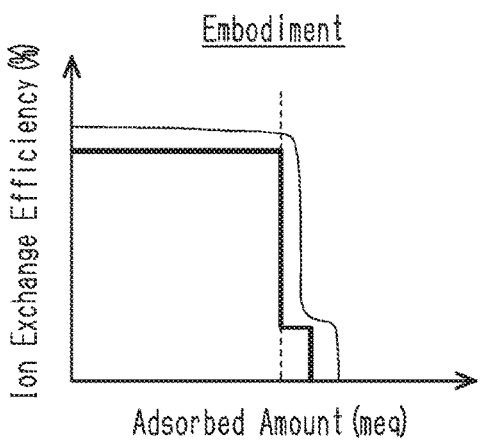
Fig.6A
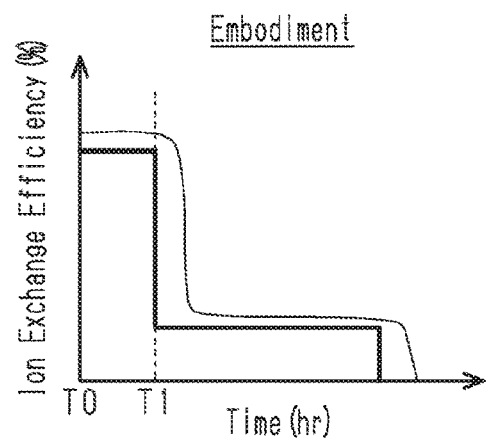
Fig.6B
Fig.7
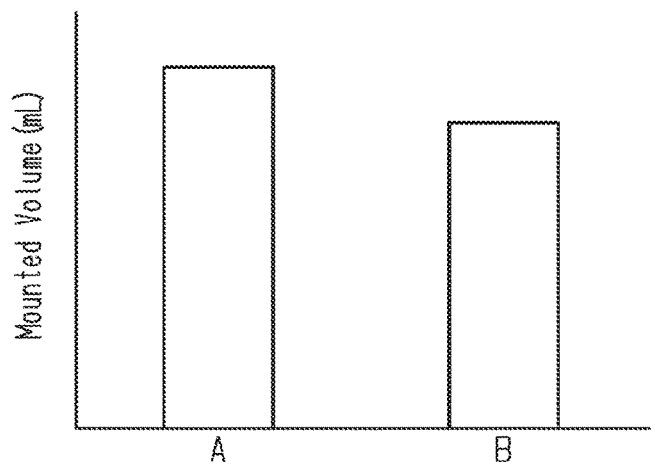

ION EXCHANGER

BACKGROUND

1. Field

The following description relates to an ion exchanger.

2. Description of Related Art

When a fuel cell is mounted on a vehicle or the like, a cooling circuit, in which coolant circulates to cool the fuel cell, is typically provided for the purpose of suppressing temperature increase of the fuel cell at the time of power generation. In such a cooling circuit, an increase in the concentration of ions in the coolant may cause corrosion of metal portions in the cooling circuit or increase the electrical conductivity of the coolant, which may reduce the performance of the fuel cell. Therefore, such a cooling circuit includes an ion exchanger to remove ions contained in the coolant through ion exchange using ion exchange resin.

The typical ion exchanger includes a housing and ion exchange resin filling the housing. The ion exchanger is configured to remove ions in the coolant through ion exchange when the coolant that has flowed into the housing passes through the ion exchange resin and discharge the coolant from which ions have been removed from the housing. Ions in coolant include cations and anions. Thus, in order to remove cations and anions from coolant, a cation exchange resin and an anion exchange resin are used as ion exchange resins as disclosed in Japanese Laid-Open Patent Publication No. 2005-11803.

In the above-mentioned cooling circuit, a relatively large amount of ions are eluted from pipes and the like into the coolant in the cooling circuit for a predetermined period (hereinafter, referred to as a washing period) after the cooling circuit is newly formed (i.e. immediately after the production of the cooling circuit). Also, when cooling a fuel cell with the coolant, the components in the coolant are thermally decomposed and ions are gradually generated. Therefore, after elution of ions from pipes and the like into the coolant in the cooling circuit subsides at the end of the washing period, the cooling circuit shifts to a period in which components of the coolant are thermally decomposed and ions are gradually generated in the coolant (hereinafter, referred to as a normal period).

In the above-described cooling circuits, there is a demand to effectively remove ions from the coolant both in the washing period and the normal period. Therefore, in order to meet such a demand, it is important to determine the amount and composition of the ion exchange resin filling the housing of the ion exchanger, including determining the amounts and compositions of a cation exchange resin and an anion exchange resin.

To reduce the size and weight of the ion exchange in the above-described cooling circuit, the amount of the ion exchange resin filling the housing may be minimized while effectively removing ions from the coolant.

However, a typical ion exchanger has a relatively large amount of ion exchange resin filling the housing so that the ion exchange performance will not be reduced even if the ion exchange resin is thermally deteriorated due to the temperature of the coolant in the cooling circuit exceeding the heatproof temperature of the ion exchange resin. As a result, this hinders reduction in the size and weight of the ion exchanger.

In addition, if the amount of ion exchange per unit volume in the ion exchange resin (ion exchange capacity) is increased, the amount of ion exchange resin filling the housing can be effective, even if the amount is relatively small. However, this configuration reduces the contact area of the ion exchange resin with the coolant when the coolant passes through the ion exchanger. Accordingly, the ion removal rate (ion exchange efficiency) per unit flow rate of the coolant decreases. Therefore, when a relatively large amount of ions are eluted from the pipes and the like into the coolant in the cooling circuit during the washing period, the ion exchanger may fail to effectively remove ions from the coolant.

SUMMARY

Accordingly, it is an objective of the following description to provide a compact and lightweight ion exchanger that is capable of effectively removing ions from coolant both in a washing period and a normal period.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an ion exchanger is provided that includes a housing and an ion exchange resin filling the housing. The ion exchanger is configured to remove ions in a coolant through ion exchange when the coolant that has flowed into the housing passes through the ion exchange resin. The ion exchanger is also configured to discharge, from the housing, the coolant from which the ions have been removed. The ion exchange resin comprises a cation exchange resin, a strongly basic anion exchange resin, and a weakly basic anion exchange resin.

Other features and aspects will be apparent from the following detailed description, the drawings, and the claims.

BRIEF DESCRIPTION OF THE DRAWINGS

FIGS. 5A and 5B are graphs showing changes in the ion exchange efficiency of an ion exchanger of a comparative example.

FIGS. 6A and 6B are graphs showing changes in the ion exchange efficiency of the ion exchanger of the embodiment.

FIG. 7 is a graph showing comparison of the total amounts of ion exchange resins in the ion exchanger.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An ion exchanger according to an embodiment will now be described with reference to FIGS. 1 to 7.

Figure 1:
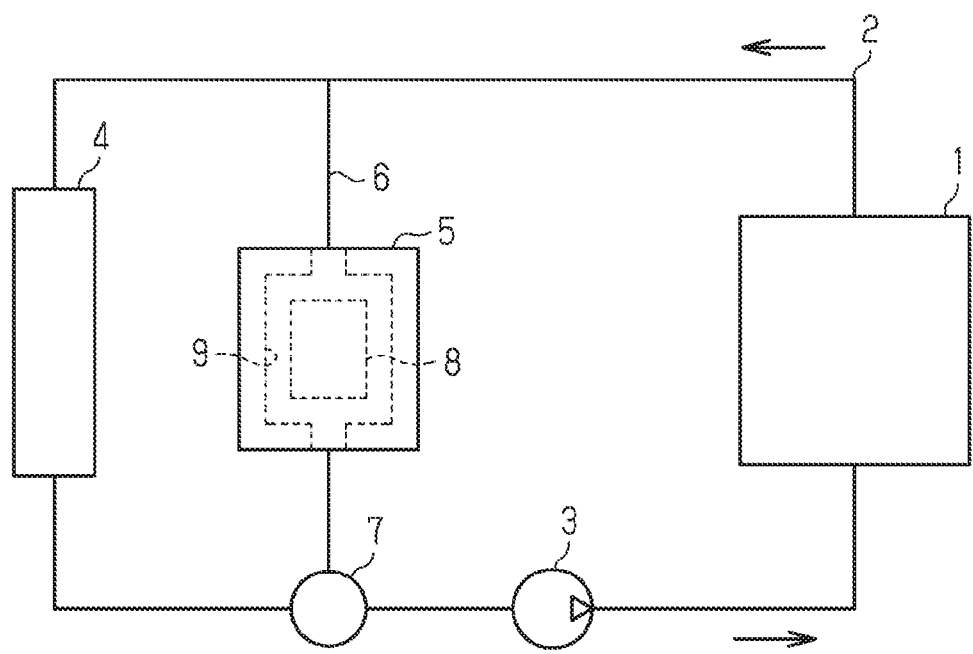
FIG. 1 is a schematic diagram showing the overall configuration of a cooling circuit provided with an ion exchanger.
Figure 2:
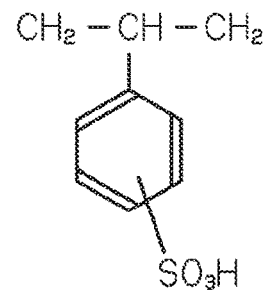
FIG. 2 is a diagram showing the chemical formula of a strongly acidic cation exchange resin.
Figure 3:
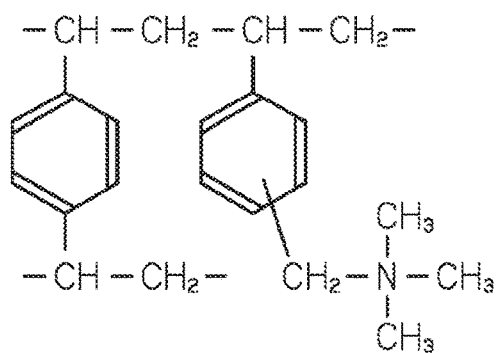
FIG. 3 is a diagram showing the chemical formula of a strongly basic anion exchange resin.
Figure 4:
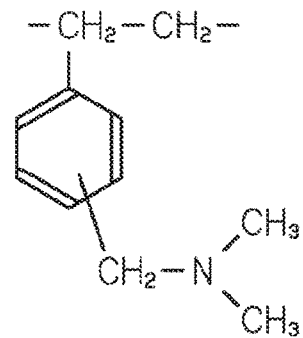
FIG. 4 is a diagram showing the chemical formula of a weakly basic anion exchange resin.

As shown in FIG. 1, a vehicle equipped with a fuel cell 1 is provided with a cooling circuit 2 in which coolant flows to cool the fuel cell 1. As such coolant, cooling water containing ethylene glycol ("long life coolant") or the like is used. The cooling circuit 2 includes a pump 3, which is driven to circulate the coolant.

In the cooling circuit 2, the fuel cell 1 is arranged in a section on the downstream side of the pump 3. The cooling circuit 2 includes a radiator 4 in a section that is downstream of the fuel cell 1 and upstream of the pump 3. The fuel cell 1, of which the temperature increases during power generation, is cooled by the coolant circulating through the cooling circuit 2 and passing through the fuel cell 1. When heated by taking heat from the fuel cell 1, the coolant is cooled by the outside air when passing through the radiator 4 and then flows to the pump 3.

The cooling circuit 2 is provided with an ion exchanger 5 for removing ions contained in the coolant and a bypass pipe 6 for causing the coolant to flow to the ion exchanger 5. The ion exchanger 5 is provided in the middle of the bypass pipe 6. One end of the bypass pipe 6 is connected to a section of the cooling circuit 2 that is downstream of the fuel cell 1 and upstream of the radiator 4. The other end of the bypass pipe 6 is connected via a valve 7 to a section of the cooling circuit 2 that is downstream of the radiator 4 and upstream of the pump 3.

The valve 7 opens and closes in order to determine whether the coolant that has passed through the fuel cell 1 flows to the bypass pipe 6 (the ion exchanger 5). More specifically, when the valve 7 is closed, the coolant flows toward the radiator 4 without flowing to the bypass pipe 6. In contrast, when the valve 7 is opened, some of the coolant that has passed through the fuel cell 1 flows into the bypass pipe 6 instead of flowing toward the radiator 4. The coolant that has flowed into the bypass pipe 6 in this manner undergoes ion removal when passing through the ion exchanger 5 and then flows to a section of the cooling circuit 2 that is downstream of the radiator 4 and upstream of the pump 3.

The ion exchanger 5 will now be described.

The ion exchanger 5 includes a housing 9 and an ion exchange resin 8 filling the housing 9. The ion exchanger 5 is configured to remove ions in the coolant through ion exchange when the coolant that has flowed into the housing 9 passes through the ion exchange resin 8 and discharge the coolant from which ions have been removed from the housing 9. Ions in the coolant include cations and anions. Thus, in order to remove cations and anions from the coolant, a cation exchange resin and an anion exchange resin are used as the ion exchange resin 8.

In the cooling circuit 2, a relatively large amount of ions are eluted from pipes or the like into the coolant in the cooling circuit 2 for a predetermined period (hereinafter, referred to as a washing period) after the cooling circuit is newly formed (i.e. immediately after the production of the cooling circuit). Also, when cooling the fuel cell 1 with the coolant, the components in the coolant are thermally decomposed and ions are gradually generated. Therefore, after elution of ions from pipes and the like into the coolant in the cooling circuit subsides at the end of the washing period, the cooling circuit shifts to a period in which components of the coolant are thermally decomposed and ions are gradually generated in the coolant (hereinafter, referred to as a normal period).

In the ion exchanger 5, in order to effectively remove ions from the coolant both in the washing period and the normal period described above, the type, amount, and composition of the ion exchange resin 8 filling the housing 9 are determined. The ion exchange resin 8 includes a strongly acidic cation exchange resin shown in FIG. 2 as the cation exchange resin. The ion exchange resin 8 also includes, as the anion exchange resin, a strongly basic anion exchange resin shown in FIG. 3 and a weakly basic anion exchange resin shown in FIG. 4.

The molar equivalent of the strongly acidic cation exchange resin in relation to the total amount of the ion exchange resin 8 may be 30 to 40%. The molar equivalent of the strongly basic anion exchange resin in relation to the total amount of the ion exchange resin 8 may be 50 to 60%. The molar equivalent of the weakly basic anion exchange resin in relation to the total amount of the ion exchange resin 8 may be 8 to 30%.

The operation of the ion exchanger 5 will now be described.

The weakly basic anion exchange resin in the ion exchange resin 8 has a higher heatproof temperature than the strongly basic anion exchange resin, although it has limited types of ions that are allowed to be ion-exchanged compared to the strongly basic anion exchange resin. The weakly basic anion exchange resin also has a greater amount of ion exchange per volume (ion exchange capacity) than the strongly basic anion exchange resin. Therefore, if the ratio of the weakly basic anion exchange resin in the ion exchange resin 8 filling the housing 9 is increased, the total amount of the ion exchange resin 8 is reduced. This can serve to reduce the size and the weight of the ion exchanger 5.

However, if only a weakly basic anion exchange resin is used as the anion exchange resin in the ion exchange resin 8 to reduce the total amount of the ion exchange resin 8, the contact area of the coolant with the ion exchange resin 8 when the coolant passes the ion exchanger 5 decreases. This reduces the ion removal rate (ion exchange efficiency) per unit flow rate of the coolant. Therefore, when a relatively large amount of ions are eluted from the pipes and the like into the coolant in the cooling circuit 2 during the washing period of the cooling circuit 2 using the ion exchanger 5, the ion exchanger 5 may fail to effectively remove ions from the coolant.

Moreover, if only a strongly basic anion exchange resin is used as the anion exchange resin in the ion exchange resin 8, a relatively large amount of the strongly basic anion exchange resin needs to be used since the ion exchange capacity of the strongly basic anion exchange resin is less than that of the weakly basic anion exchange resin. In addition, since the strongly basic anion exchange resin has a lower heatproof temperature than the weakly basic anion exchange resin, the amount of the strongly basic anion exchange resin may be increased to prevent the ion exchange performance from deteriorating even if the strongly basic anion exchange resin thermally deteriorates. As a result, if only the strongly basic anion exchange resin is used as the anion exchange resin of the ion exchange resin 8, the total amount of the ion exchange resin 8 inevitably increases. This hampers reduction in the size and the weight of the ion exchanger 5.

FIGS. 5A and 5B represent a comparative example and show changes in the ion exchange efficiency in the ion exchanger 5 over the washing period and the normal period when only the strongly basic anion exchange resin is used as the anion exchange resin of the ion exchange resin 8.

The horizontal axis of the graph in FIG. 5A represents the cumulative value of ions removed from coolant by the ion exchanger 5 (hereinafter, referred to as an adsorbed amount). In the graph of FIG. 5A, the thick line represents the relationship between the adsorbed amount and the required value of the ion exchange efficiency, and the thin line represents the relationship between the adsorbed amount and the measured value of the ion exchange efficiency. The horizontal axis of the graph of FIG. 5B represents time. In the graph of FIG. 5B, the thick line represents changes in the required value of the ion exchange efficiency in relation to the passage of time, and the thin line represents changes in the measured value of the ion exchange efficiency in relation to the passage of time. The period from a point in time T0 to a point in time T1 in the graph of FIG. 5B represents the washing period from when the cooling circuit 2 was brand new immediately after the production. The period after the point in time T1 represents the above-described normal period. In the graph of FIG. 5A, the washing period is switched to the normal period at the point indicated by the broken line.

As can be seen from FIGS. 5A and 5B, the required value of the ion exchange efficiency represented by the thick line is set to a relatively large value in the washing period (from the point in time T0 to the point in time T1 in FIG. 5B) and is set to a relatively small value in the normal period (after the point in time T1 in FIG. 5B). This is because a relatively large amount of ions are eluted from the pipes and the like into the coolant in the cooling circuit 2 during the washing period, and the elution of ions from the pipes and the like into the coolant in the cooling circuit 2 subsides during the normal period, whereas the components of coolant are thermally decomposed so that ions are gradually generated in the coolant.

The measured value of the ion exchange efficiency, which is represented by the thin line, changes while being sufficiently greater than the required value of the ion exchange efficiency particularly in the above-described normal period (after the point in time T1 in FIG. 5B), that is, while being separated upward from the thick lines in FIGS. 5A and 5B. This is because when only the strongly basic anion exchange resin is used as the anion exchange resin in the ion exchange resin 8, the amount of the strongly basic anion exchange resin is increased in order to maintain the ion exchange amount during the washing period at a required value and maintain the ion exchange performance at a required value when the temperature of the coolant increases during the normal period (after the point in time T1 in FIG. 5B). That is, in particular, during the above-described normal period (after the point in time T1 in FIG. 5B), the measured value of the ion exchange efficiency changes with a relatively large margin with respect to the required value of the ion exchange efficiency because an increase in the amount of the strongly basic anion exchange resin makes the performance of the ion exchanger 5 become excessive in terms of the ion exchange efficiency during the above-described normal period.

FIGS. 6A and 6B show changes in the ion exchange efficiency of the ion exchanger 5 of the present embodiment in the above-described washing period and the above-mentioned normal period. The horizontal axis of the graph of FIG. 6A represents the cumulative value (adsorbed amount) of ions removed from the coolant by the ion exchanger 5 as in the case of FIG. 5A. The horizontal axis of the graph of FIG. 6B represents time as in the case of FIG. 5B. In the graph of FIG. 6A, the thick line represents the relationship between the adsorbed amount and the required value of the ion exchange efficiency, and the thin line represents the relationship between the adsorbed amount and the measured value of the ion exchange efficiency. In the graph of FIG. 6B, the thick line represents changes in the required value of the ion exchange efficiency in relation to the passage of time, and the thin line represents changes in the measured value of the ion exchange efficiency in relation to the passage of time.

As can be seen from FIGS. 6A and 6B, in the ion exchanger 5 of the present embodiment, the measured value of the ion exchange efficiency (thin line) changes at positions closer to the required value of the ion exchange efficiency (thick line) than the comparative example of FIGS. 5A and 5B. That is, the measured value changes at positions that are not significantly separated upward from the thick line in FIGS. 6A and 6B. In particular, during the above-described normal period (after the point in time T1 in FIG. 6B), the measured value of the ion exchange efficiency (thin line) changes at a position significantly close to the target value of the ion exchange efficiency (thick line). This is because, in the ion exchanger 5 of the present embodiment, the ion exchange resin 8 filling the housing 9 includes a strongly acidic cation exchange resin, a strongly basic anion exchange resin, and a weakly basic anion exchange resin.

Since the above-described weakly basic anion exchange resin has a higher heatproof temperature than the strongly basic anion exchange resin, it is not necessary to increase the amount of the weakly basic anion exchange resin in order to maintain the ion exchange performance at the necessary value when the coolant temperature increases during the above normal period. In addition, since the ion exchange capacity of the above-described weakly basic anion exchange resin is greater than that of the strongly basic anion exchange resin, the amount necessary for effectively removing ions from the coolant during the above-described normal period will be reduced. Therefore, by including the weakly basic anion exchange resin in the ion exchange resin 8, the total amount of the ion exchange resin 8 filling the housing 9 is reduced, and the measured value of the ion exchange efficiency (thin line) in the normal period (after the point in time T1 in FIG. 6B) is allowed to be brought closer to the target value (thick line). As a result, unlike the comparative example of FIGS. 5A and 5B, the performance of the ion exchanger 5 of the present embodiment will not be excessive in terms of the ion exchange efficiency.

In contrast, the strongly basic anion exchange resin has a smaller ion exchange capacity than the weakly basic anion exchange resin. Accordingly, in order to obtain an equivalent ion exchange performance as the above-described weakly basic anion exchange resin, housing 9 must be filled with a relatively large amount of strongly basic anion exchange resin.

Such an increase in the amount of strongly basic anion exchange resin increases the contact area of the ion exchange resin 8 with the coolant passing through the ion exchanger 5. Therefore, including the strongly basic anion exchange resin in the ion exchange resin 8 increases the contact area of the ion exchange resin 8 with the coolant passing through the ion exchanger 5. This limits reduction in the ion exchange efficiency due to a relatively small contact area during the washing period.

Therefore, in the ion exchanger 5 of the present embodiment, since the ion exchange resin 8 includes the strongly acidic cation exchange resin, the strongly basic anion exchange resin, and the weakly basic anion exchange resin, ions are effectively removed from the coolant both in the washing period and the normal period. Also, it is possible to reduce the amount of the ion exchange resin 8 filling the housing 9.

In FIG. 7, the value A represents the total amount (mounted volume) of the ion exchange resin 8 in a case of the comparative example that uses only a strongly basic anion exchange resin as the anion exchange resin in the ion exchange resin 8 (FIGS. 5A and 5B). In FIG. 7, the value B represents the amount (mounted volume) of the ion exchange resin 8 in the ion exchanger 5 of the present embodiment (FIGS. 6A and 6B). As seen in FIG. 7, the ion exchanger 5 of the present embodiment is capable of reducing the total amount of the ion exchange resin 8. This in turn reduces the size and the weight of the ion exchanger 5.

The present embodiment as described above has the following advantage.

(1) The ion exchanger 5 effectively removes ions from coolant both in the washing period and the normal period, and it is possible to reduce the size and the weight of the ion exchanger 5.

(2) The weakly basic anion exchange resin in the ion exchange resin 8 exhibits sufficient ion exchange performance when in an acidic environment. The ion exchange resin 8 includes a strongly acidic cation exchange resin as a cation exchange resin, and the strongly acidic cation exchange resin generates hydrogen ions (protons) during ion exchange in the coolant. Accordingly, the coolant tends to be acidic. As a result, the weakly basic anion exchange resin is placed in an acidic environment, which allows the weakly basic ion exchange resin to sufficiently perform the ion exchange.

The above-described embodiment may be modified as follows.

The cation exchange resin included in the ion exchange resin 8 does not need to be a strongly acidic cation exchange resin. Instead, a cation exchange resin other than a strongly acidic cation exchange resin may be included in the ion exchange resin 8. In addition, even when using a cation exchange resin other than a strongly acidic cation exchange resin as the cation exchange resin in the ion exchange resin 8, the coolant (ethylene glycol) is thermally decomposed to generate glycolic acid, so that the coolant tends to be acidic. Also, the coolant tends to be acidic by contacting carbon dioxide contained in the ambient atmosphere (atmosphere) of the cooling circuit 2. Therefore, even when a cation exchange resin other than a strongly acidic cation exchange resin is used, the weakly basic anion exchange resin included in the ion exchange resin 8 is allowed to be placed in an acidic environment.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An ion exchanger, comprising:
a housing; and
an ion exchange resin filling the housing, wherein the ion exchanger is configured to
remove ions in a coolant through ion exchange when the coolant that has flowed into the housing passes through the ion exchange resin, and
discharge, from the housing, the coolant from which the ions have been removed, and
the ion exchange resin comprises
a strongly acidic cation exchange resin wherein a molar equivalent of the strongly acidic cation exchange resin in relation to a total amount of the ion exchange resin is 30 to 40%,
a strongly basic anion exchange resin wherein a molar equivalent of the strongly basic anion exchange resin in relation to the total amount of the ion exchange resin is 50 to 60%, and
a weakly basic anion exchange resin wherein a molar equivalent of the weakly basic anion exchange resin in relation to the total amount of the ion exchange resin is 8 to 30%.

* * * * *